United States Patent
Stoakes

(10) Patent No.: US 12,282,667 B1
(45) Date of Patent: Apr. 22, 2025

(54) METADATA CHECKING WITH ZERO STORAGE OVERHEAD

(71) Applicant: Amazon Technologies, Inc., Seattle, WA (US)

(72) Inventor: Timothy John Stoakes, Forreston (AU)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 18/467,570

(22) Filed: Sep. 14, 2023

(51) Int. Cl.
*G06F 3/06* (2006.01)

(52) U.S. Cl.
CPC .......... *G06F 3/0622* (2013.01); *G06F 3/0619* (2013.01); *G06F 3/0653* (2013.01); *G06F 3/0673* (2013.01)

(58) Field of Classification Search
CPC .... G06F 3/0622; G06F 3/0619; G06F 3/0653; G06F 3/0673
See application file for complete search history.

(56) References Cited

U.S. PATENT DOCUMENTS

| | | | |
|---|---|---|---|
| 7,873,878 B2 | 1/2011 | Belluomini et al. | |
| 9,152,512 B2* | 10/2015 | Cronin | G06F 11/1004 |
| 2018/0101842 A1* | 4/2018 | Ventura | G06Q 10/087 |
| 2021/0286538 A1* | 9/2021 | Volkov | H03M 13/154 |
| 2024/0020195 A1* | 1/2024 | Cross | G06F 11/1048 |

\* cited by examiner

*Primary Examiner* — Masud K Khan
(74) *Attorney, Agent, or Firm* — S. Scott Foster; Kowert, Hood, Munyon, Rankin & Goetzel, P.C.

(57) ABSTRACT

A storage application may provide protection of data accesses by clients without incurring metadata storage costs. A request to store a record may be received, where subsequent accesses to the stored data are protected by an access condition that includes a key or other metadata. To store the record, a composite record including the record and the security key may be generated and a detection code may be determined for the composite record. The record may then be stored along with the detection code. A request to access the record may then be received, the access request including an access key. The record and detection code may be retrieved and a new composite record including the retrieved record and the access key may be generated. Satisfaction of the access condition may be determined according to a new detection code generated from the new composite record.

20 Claims, 11 Drawing Sheets

METADATA CHECKING WITH ZERO STORAGE OVERHEAD

BACKGROUND

Multi-tenant data storage often requires verification of ownership or rights to access particular data records. Traditionally, access metadata, i.e. metadata controlling access to data, may be stored in addition to the data for verification purposes. Additional metadata providing error detection capabilities for the client data may also be stored in addition to the data. Subsequent accesses of the client data may involve both the verification of error detection codes as well as loading and verifying of the access metadata, leading to additional storage costs, increased latencies and computational demands.

Figure 1:
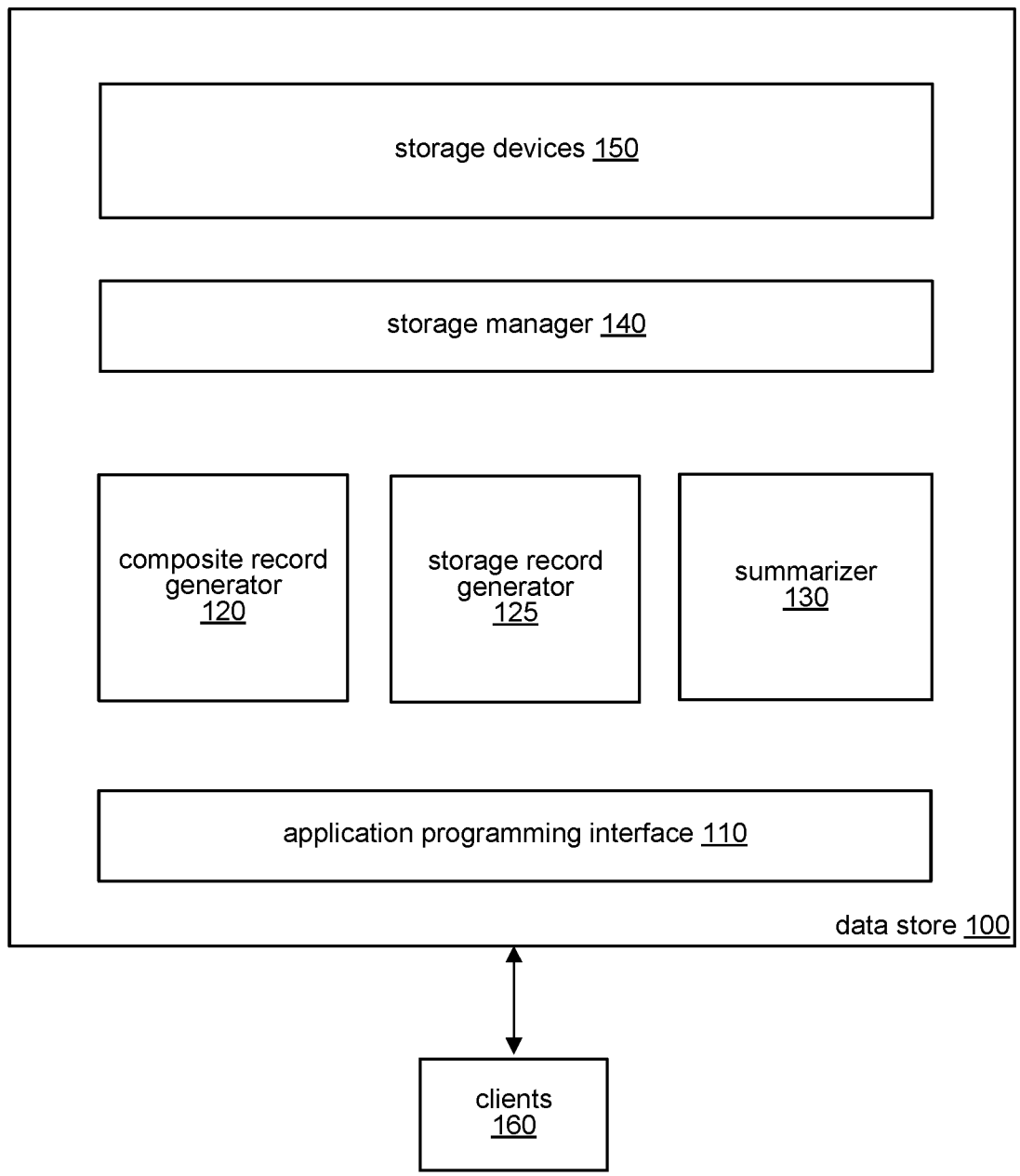
FIG. 1 illustrates a data store implementing metadata checking with zero storage overhead, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

A summary or digest of data is a value which describes the data in a way that is more convenient to work with for some operations such as equality comparisons. Perhaps less processing is required to compare two summaries, and/or perhaps less storage space is required to store the summaries. Common examples of summaries include checksums, CRCs and cryptographic hashes (e.g. SHA256). In most cases, the trade-off made in the use of summaries is that comparing summaries can introduce errors such as false positives or false negatives.

Different summary algorithms may have different properties regarding changes in the data causing changes also in the summary (e.g. CRC has different behavior for burst errors vs. random errors). A corollary to this is that there is generally no way to compute the data given a summary (i.e. to calculate the checksum 'in reverse'). In some cases this is a nuisance, but in many cases e.g. cryptographic hashes, it is a strong requirement that this 'reverse' operation be infeasible.

Consider an example use case: a storage system may traditionally store a 4 KB data block along with another metadata block which contains the name of the owner of that block and a CRC of data+metadata (the summary is the CRC, the data is 4 KB+owner). When an entity asks for a data block to be read, the entity's name may be compared to the name of the block's owner as stored in the metadata (after checking the CRC to ensure the metadata is trustworthy), and an error may be returned if they do not match. In another example, the summary may be a CRC of a block of data and no other metadata and the CRC is checked when the data is read. This CRC check may be used to verify the integrity of the data. As the application and function of these summaries increase, storage requirements may also increase.

As discussed above, multi-tenant data storage often requires verification of ownership or rights to access particular data records. Traditionally, metadata controlling access to data may be stored along side the data for verification purposes, as in the first example discussed earlier. In addition, additional metadata providing error detection capabilities for the client data may be stored along side the client data. Subsequent accesses of the client data may involve both the verification of error detection codes as well as loading and verifying of the access metadata, leading to additional storage costs, increased latencies and computational demands.

Described herein are systems and methods implementing storage techniques that include metadata checking with zero or minimal increased storage and processing overhead. These storage techniques may provide protection of data accesses by clients without incurring metadata storage costs. A request to store a data record may be received, where subsequent accesses to the stored data are protected by an access condition that includes a key, ownership ID or other metadata. To store the data record, a composite data record including the data record and the security key may be generated and a summary may be determined for the composite data record. The data record may then be stored along with the summary. A request to access the data record may then be received, the access request including an access key. The record and summary may be retrieved and a new composite data record including the retrieved data record and new key may be generated. Satisfaction of the access condition may be determined according to a new summary generated from the new composite data record. Using this technique, metadata checking can be implemented along with other summary functions and with little or no increase in storage requirements for the summary.

FIG. 1 illustrates a data store implementing metadata checking with zero storage overhead, according to some embodiments. A data store 100 may receive data requests from clients 160 via a programmatic interface such as the application programming interface 110 and clients 160 may connect to the data store 100 through a variety of communications interfaces such as I/O interfaces, peripheral interfaces and network interfaces as discussed below regarding FIG. 11. The data store 100 may, in some embodiments, be implemented as a distributed system and, such embodiments described herein, or any of their components, may be implemented as one or more network-based services, as discussed in further detail below in FIG. 10. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations. In still other embodiments, the data store 100 may be implemented as part of a peripheral device such as a network controller, storage controller or storage device. As such, components of an exemplary computer system, such as shown below in FIG. 11, may implement a portion of such a peripheral device implementing a data store that provides metadata checking with zero storage overhead.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Requests received from clients 160 at the data store 100 via the API 110 may include write, store, or update requests. Implementation of such write requests are described in further detail in FIGS. 2-6. To process a write request, the data store 100 may receive the request such as described in FIG. 2 and generate a composite data record using the composite record generator 120. The data store may then generate a composite summary for the composite data record using the summarizer 130. Then, the data store 100 may generate a storage record, such as shown below in FIG. 4, using the storage record generator 125 and store the storage record on storage devices 150 using storage manager 140.

Figure 2:
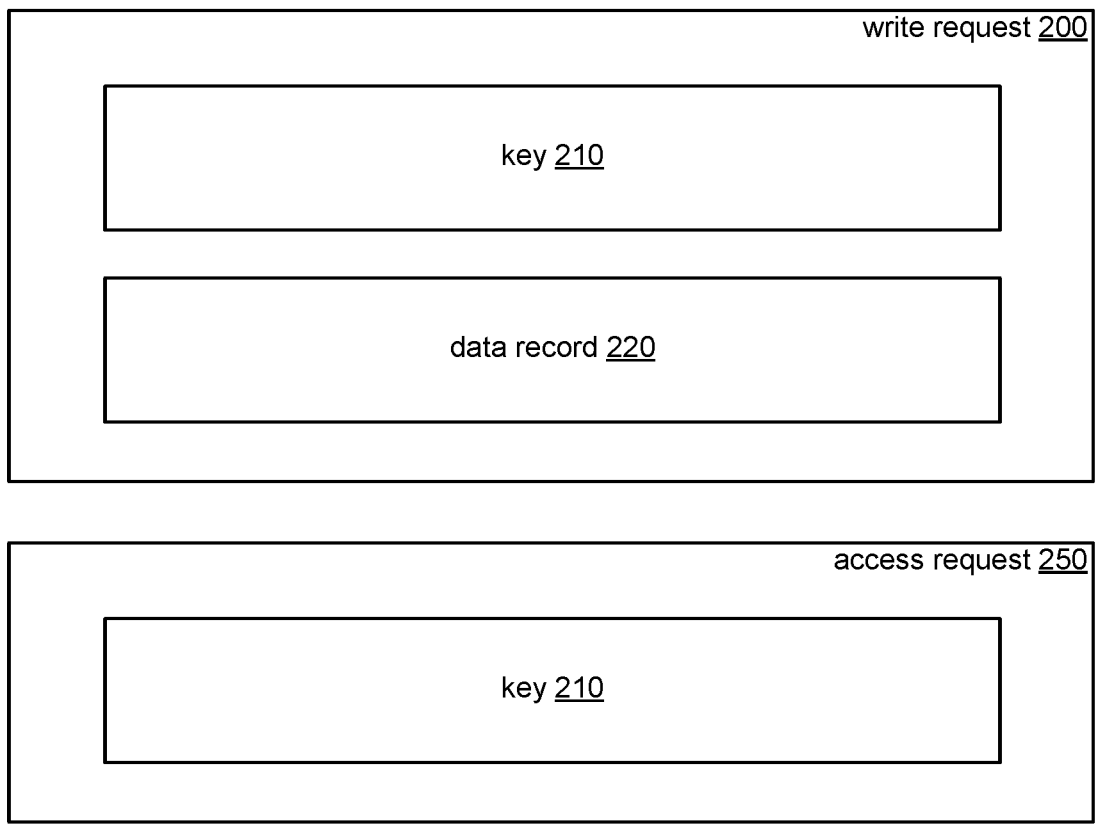
FIG. 2 illustrates example write and access request structures for a data store implementing metadata checking with zero storage overhead, according to some embodiments.

Requests received from clients 160 at the data store 100 via the API 110 may also include read or access requests. Implementation of such access requests are described in further detail in FIG. 6. To process an access request, the data store 100 may receive the request that includes a key or other metadata useful to satisfy an access condition for the access request, such as shown in FIG. 2. The data store may retrieve the requested data record from the storage devices 150 using the storage manager 140 and may generate a composite data record using the composite record generator 120. This composite data record is described further below in FIGS. 3A and 3B. The data store may then generate a composite summary for the composite data record using the summarizer 130. Then, the data store 100 may verify the access condition using the generated composite summary with respect to the retrieved composite summary as discussed further below in FIG. 6. The record may then be returned or an error condition indicated depending on the result of the verification.

The summarizer 130 may employ a number of computational techniques to generate summaries, in various embodiments. In some embodiments, the summarizer 130 may generate an error detecting code as a summary such as by using a checksum or cyclical redundancy check (CRC) technique. In other embodiments, the summarizer 130 may generate a summary by employing a cryptographic hash. It should be understood that these are merely examples of summarizer functions, that any number of summarizer functions may be envisioned and that these examples are not intended to be limiting. Furthermore, a data store may employ multiple summarizer computational techniques. For example, checksums or CRCs may be employed for some data types while other data types may indicate the use of cryptographic hashes. In other embodiments, the summarizer may employ different computational techniques in succession, for example a cryptographic hash may be employed followed by a checksum or CRC operation. It should be understood that these are merely examples of summarizer functions employing multiple computational techniques, that any number of summarizer functions may be envisioned and that these examples are not intended to be limiting.

Furthermore, it should be understood that verification of access requirements may employ different techniques in various embodiments. In some embodiments, verification may involve a comparison between a retrieved summary and a newly computed summary, while in other embodiments a characteristic of a summarizer function may result in a successfully verified summary having a reserved value such as zero, one or negative one. It should be understood that these are merely examples of verification operations, that any number of verification operations may be envisioned and that these examples are not intended to be limiting.

FIG. 2 illustrates example write and access request structures for a data store implementing metadata checking with zero storage overhead, according to some embodiments.

Requests received from clients, such as the clients 160 of FIG. 1, at a data store, such as the data store 100 of FIG. 1, may include write, store, or update requests that include data such as shown in write request 200. This write request may include a data record 220 to write to the data store and, in addition, may include a key 210. This key may include a client-provided password or other key, an ownership ID, a security key or other metadata of the data record. The key 210 may be used to verify or satisfy an access condition for subsequent accesses to the stored data record. In addition, if the write request targets a data record already stored in the data store, such as by an overwrite, modify or update request, the key 210 may first be used to verify satisfaction of an access condition of the existing key before modifying the data record, replacing the data record or generating a new summary using a different key, as discussed in further detail below in FIG. 6.

Requests received from clients, such as the clients 160 of FIG. 1, at a data store, such as the data store 100 of FIG. 1, may also include access requests such as read requests or delete requests. These access requests 250 may include a key 210. As in the write request 200, this key may include a client-provided password or other client-provided key, an ownership ID, a security key, a target storage location identifier or other metadata of the data record, where the key 210 may be used to verify or satisfy an access condition to perform the access request on the stored data record, as discussed below in FIG. 7.

Figure 3A:
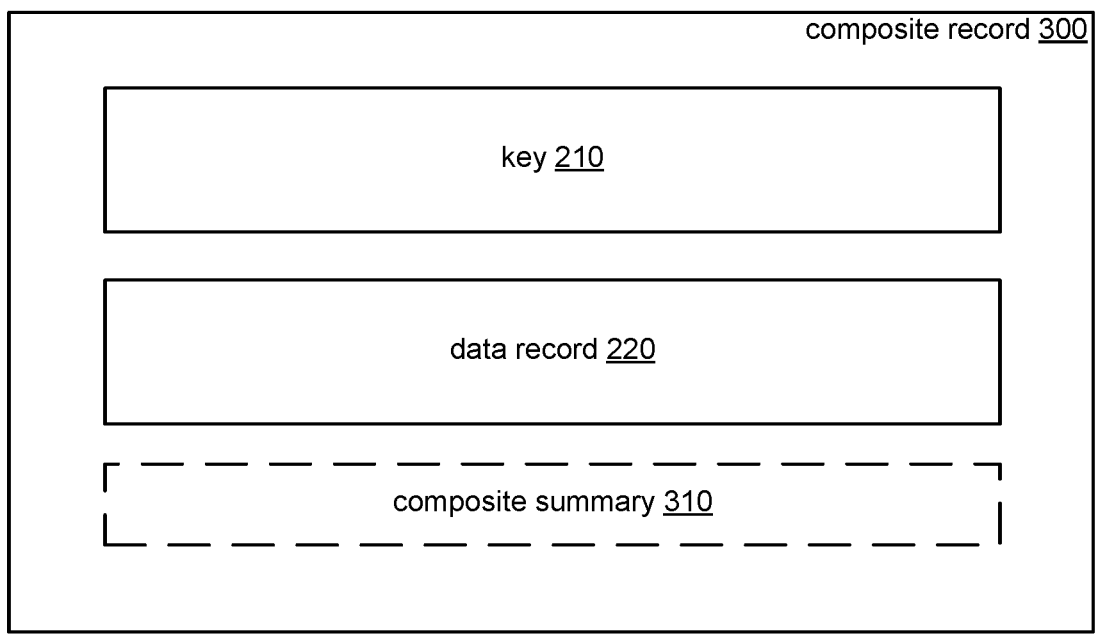
FIG. 3A illustrates an example composite data record for a data store implementing metadata checking with zero storage overhead, according to some embodiments.

FIG. 3A illustrates an example composite data record for a data store implementing metadata checking with zero storage overhead, according to some embodiments. A composite data record may be constructed by a composite record generator, such as the composite record generator 120 of FIG. 1, in order to generate a composite record summary by a summarizer, such as the summarizer 130 of FIG. 1. It should be noted that the composite record structure is a transitory structure used in the performance of various client requests and may not be stored permanently or persistently in the data store. Furthermore, it should be understood that the generating the composite data structure may be implemented in a number of ways in various embodiments. In some embodiments, the composite data structure may be a physical data structure implemented in data memory, such as in shown below in FIG. 11, whereas in other embodiments the composite structure may be implemented as a logical data structure as a set of references to other data structures and in still other embodiments implemented as a logical data structure through accessing of individual structure elements by executable code. As such, all or portions of the data structure may not have a physical representation in memory. It should be understood that these are merely examples of composite data structure implementations, that any number of implementations may be envisioned and that these examples are not intended to be limiting.

In various embodiments, a composite record may be established in a known and consistent composite record format such that verification may be successfully performed between storage of a data record and subsequent accesses of the stored record. In an embodiment of the composite record 300 as shown in FIG. 3A, the record 300 may include the key 210, the data record 220, and optionally the composite summary 310, in that composite format. Subsequent accesses to the data record may result in a new composite record being constructed in the same composite format, enabling verification of the key for access to the stored data record.

Figure 3B:
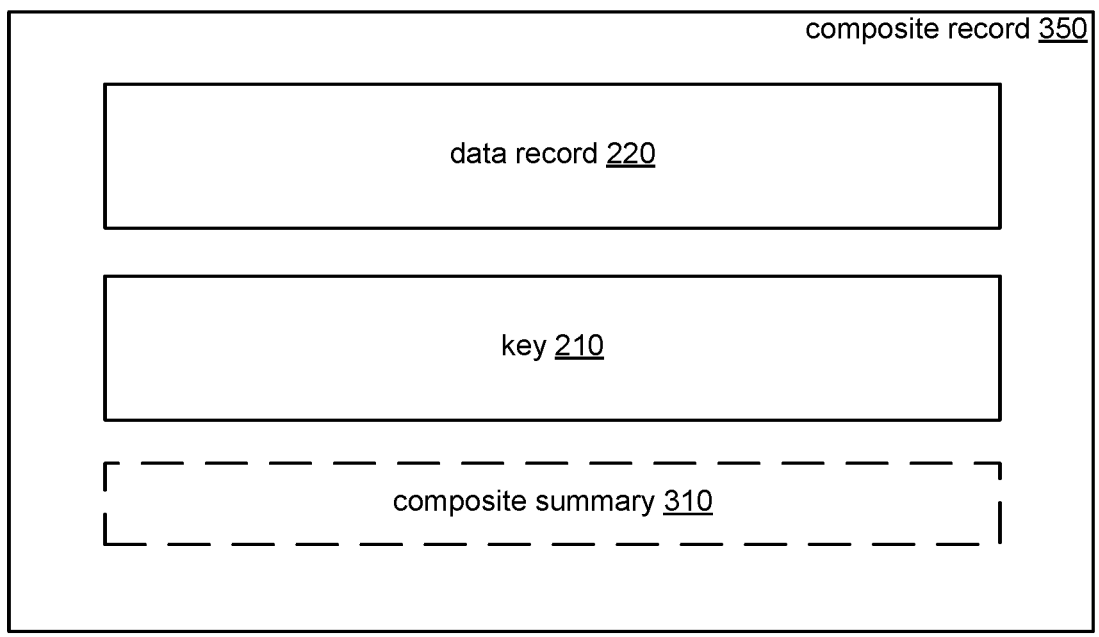
FIG. 3B illustrates an alternative example composite data record for a data store implementing metadata checking with zero storage overhead, according to some embodiments.

In some summarizer functions such as CRC and checksum functions, a characteristic of the function may be that different keys may be able to successfully pass the access condition. This allows for a possibility that the key 210 may be one of a plurality of possible keys that can satisfy an access condition. In some embodiments, this possibility may be an intended feature of the verification whereas in other embodiments it may be considered a potential weakness. In embodiments where it is desired that access passwords must match the write password, and alternative composite record, such as the composite record 350 as shown in FIG. 3B, may be employed. The composite record 350, may include the data record 220, the key 210 and optionally the composite summary 310, in that particular composite format. By not including the key 210 as the first element of composite record 350, multiple keys may not be used satisfy the access condition. It should be understood that the composite record 350 is merely one example of a composite record order than can mitigate a potential weakness of such summarizer functions, and other embodiments that may split and distribute the key 210, duplicate the key 210 or otherwise process the key 210 may also be envisioned. As such, the alternative composite record 350 of FIG. 3B is merely one example and is not intended to be limiting.

Furthermore, it should be understood that the composite summary 310 of the composite records 300 and 350 are optional components. For write requests, these summaries are created after the composite records themselves and cannot be a part of the composite records. Since the composite records are not subsequently stored, but storage records are stored, as discussed below in FIG. 4, including the composite summary 310 may serve no purpose in the composite records for write accesses. For read or delete accesses, however, the inclusion of the composite summary 310 may enable more efficient verification of an access condition. Therefore, in some embodiments a composite record may in some examples include the composite summary 310 for verification operations.

Figure 4:
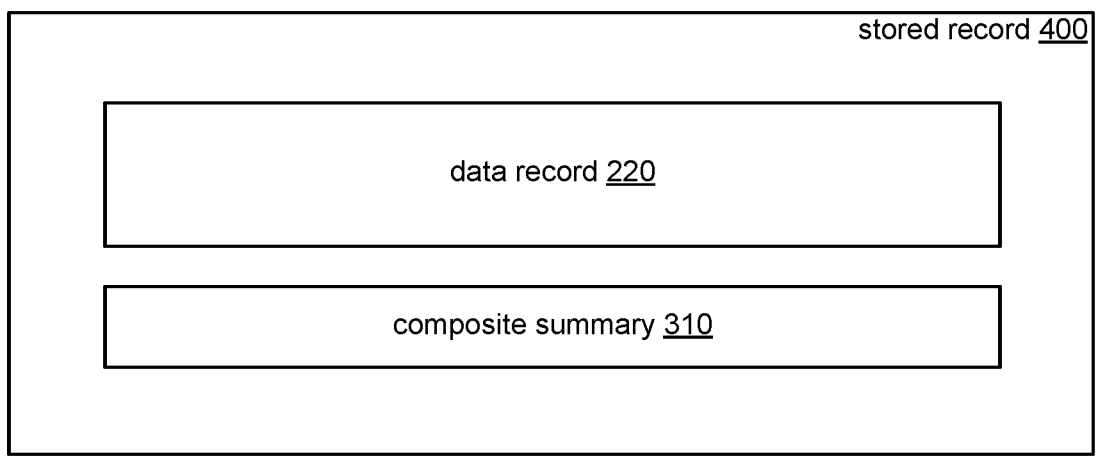
FIG. 4 illustrates an example stored data record for a data store implementing metadata checking with zero storage overhead, according to some embodiments.

FIG. 4 illustrates an example stored data record for a data store implementing metadata checking with zero storage overhead, according to some embodiments. A stored data record 400 may include a data record 220 as well as a composite summary 310. Unlike the composite record of FIGS. 3A and 3B, any ordering of fields with the stored records 400 may be employed in various embodiments. However, it should be noted that that a key, such as the key 210 of FIGS. 2-3, including a client-provided password or other key, an ownership ID, a security key or other metadata of the data record, is not included in the stored data record and is not stored in the data store. Instead, storage of this key may be viewed as implied rather than explicitly stored as the key is included as part of the composite summary 310. As such, verification of the key may be performed through use of the composite summary even though the key or other metadata of the data record is not stored in the data store.

Figure 5:
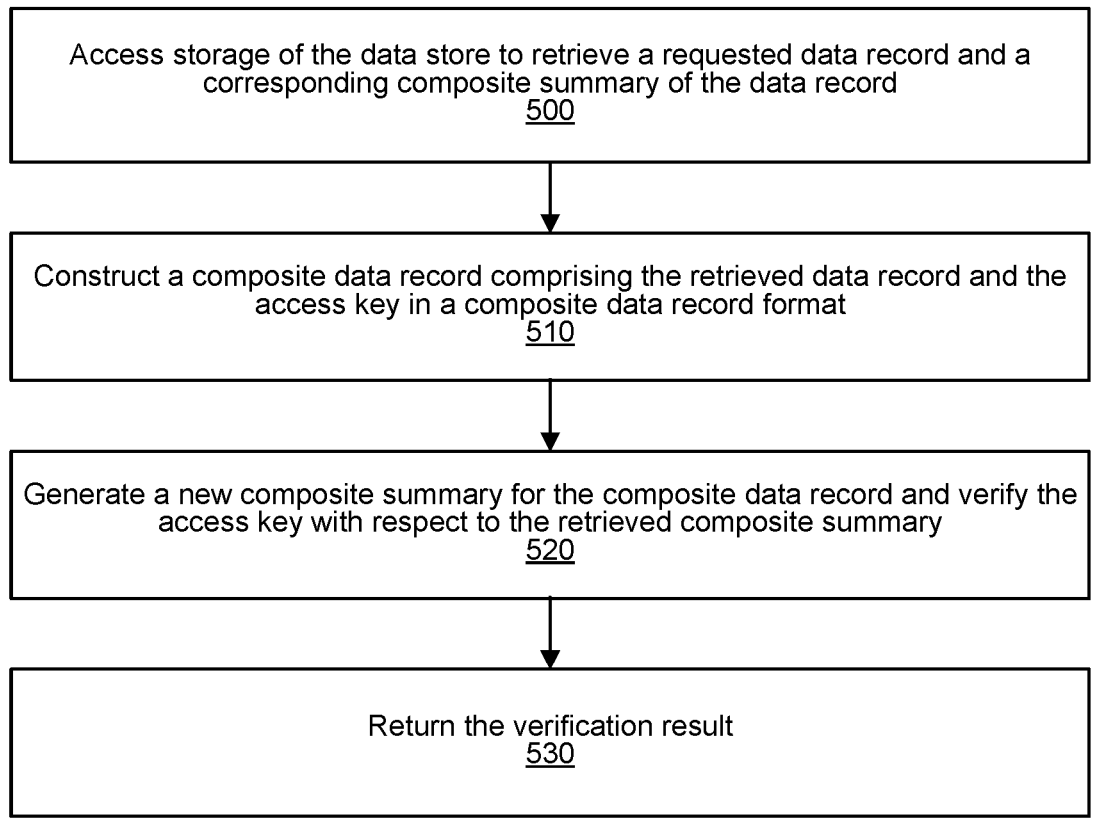
FIG. 5 illustrates a flowchart describing a verify operation of data store implementing metadata checking with zero storage overhead, in some embodiments.

FIG. 5 illustrates a flowchart describing a verify operation of data store implementing metadata checking with zero storage overhead, in some embodiments. The process begins at step 500 where a data record being accesses may be retrieved from storage. Included in the retrieving, along with the data record, is a composite summary for the data record. Examples of the stored data record and composite summary are shown above in FIG. 4.

Once the data record and composite summary have been retrieved, as shown in 510, a composite data record, such as the composite records 300 and 350 of FIGS. 3A and 3B, may be constructed. This composite record may be constructed in the same composite format as was employed in the creation of the composite summary when the data record was written to the data store.

Then, as shown in 520, a new composite summary may be generated using the generated composite record, such as by a summarizer 130 as shown in FIG. 1, in some embodiments. This new composite summary may be generated and compared to the retrieved composite summary, in some embodiments, in order to verify an access condition for accessing the data record. In other embodiments, the composite summary may be included in the new composite record and the new composite summary compared to a known result value, such as zero, one, or negative one, to verify an access condition for accessing the data record.

Once the verification result is determined, as shown in 530 the verification result may be returned, in some embodiments.

Figure 6:
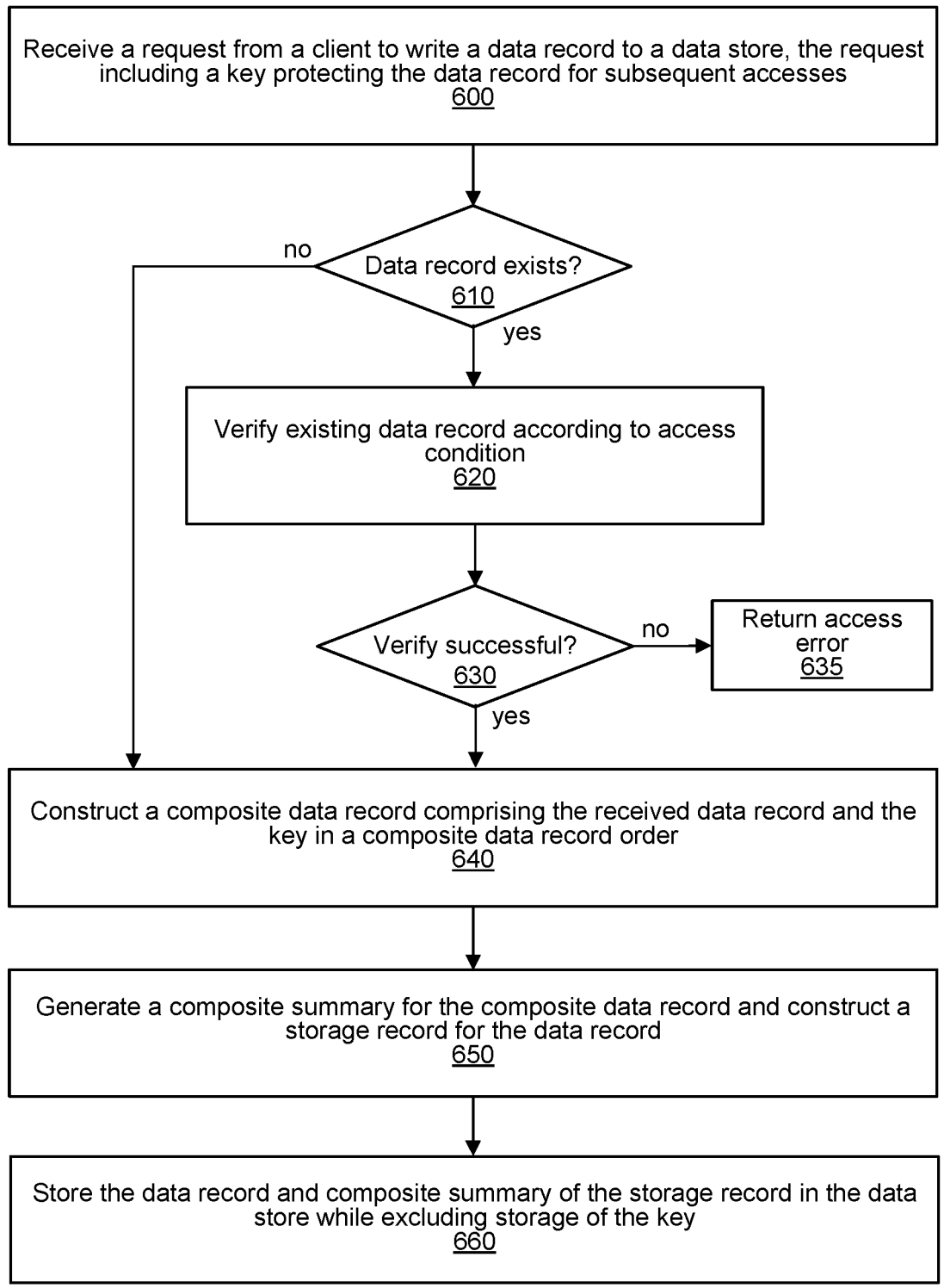
FIG. 6 illustrates a flowchart describing a write operation of data store implementing metadata checking with zero storage overhead, in some embodiments.

FIG. 6 illustrates a flowchart describing a write operation of data store implementing metadata checking with zero storage overhead, in some embodiments. The process begins at 600 where a request to perform a write access to a data record may be received. The write access may include a data record to write as well as a key, such as a client-provided password or other key, an ownership ID, a security key or other metadata of the data record. Examples of write request data are discussed above in FIG. 2.

Next, as shown in 610, it may be determined if the data record to be written already exists in the data store. If the data record does not exist, as shown in a negative exit from 610, the process may advance to step 640. If the data record does exist, as shown in a positive exit from 610, the process must first verify access for the existing data record.

As shown in 620, the process may then verify access for the existing data record using the verification process as shown in FIG. 5. If the verification is successful, as shown in a positive exit from 630, the process may advance to step 640. If the verification is not successful, as shown in a negative exit from 630, the process may return an access error for the write request, as shown in 635.

As shown in 640, a composite data record may be constructed that includes the provided key and data record in a particular composite format, as discussed above in FIGS. 3A and 3B. This composite format will then be used in verification for future accesses of the data record once stored at the data store, in various embodiments.

Then, as shown in 650, a composite summary may be generated, such as by a summarizer 130 as shown in FIG. 1, for the composite data record. This composite summary may then be used to construct a storage record that includes the data record and the composite summary but excludes the key such that the key is not stored in the data store. Then, as shown in 660, the storage record, including the data record and composite summary, may be written to the data store without writing the key for the data record to the data store.

Figure 7:
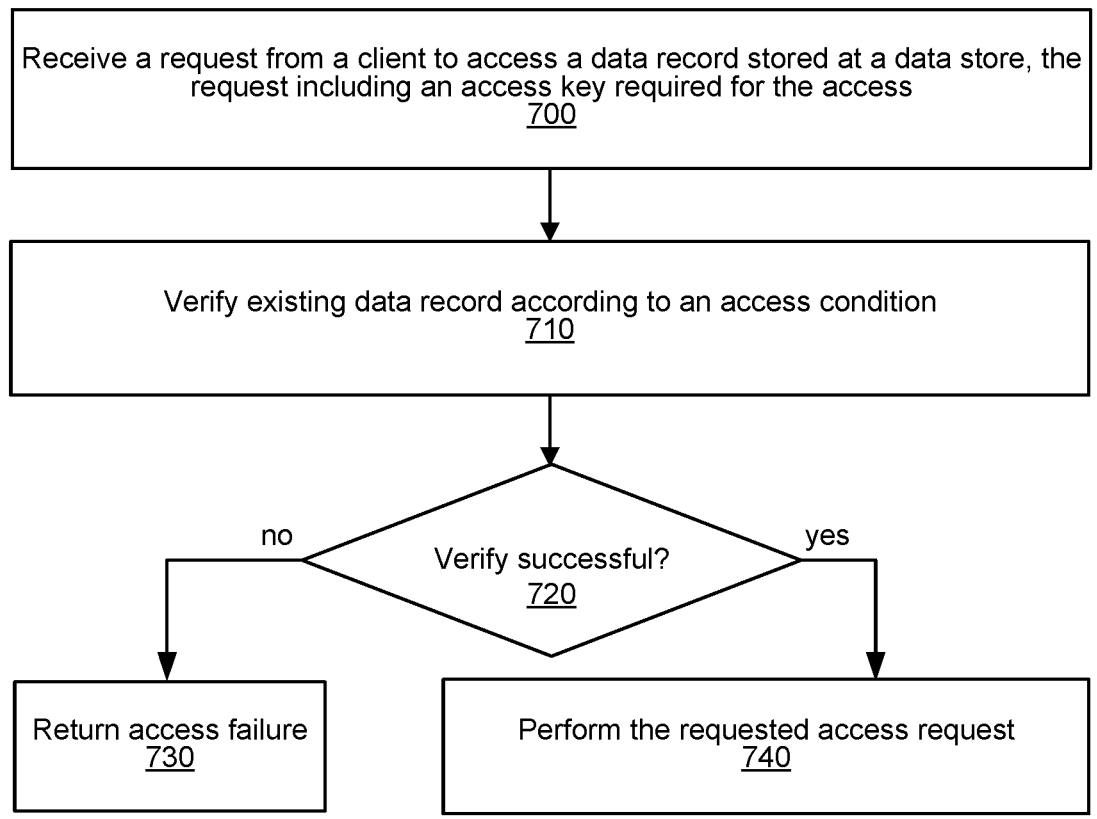
FIG. 7 illustrates a flowchart describing a read access operation of data store implementing metadata checking with zero storage overhead, in some embodiments.

FIG. 7 illustrates a flowchart describing an access operation of data store implementing metadata checking with zero storage overhead, in some embodiments. Examples of access operations may include read operations and delete operations, in some embodiments.

The process begins at 700 where a request to perform an access operation at a data store may be received. The request may include an access key, such as a client-provided password or other key, an ownership ID, a security key or other metadata of the desired data record. To perform the requested access, the provided access key must pass an access condition verification, in some embodiments.

As shown in 710, the process may then verify access for the requested data record using the verification process as shown in FIG. 5. If the verification is successful, as shown in a positive exit from 720, the process may advance to step 740. If the verification is not successful, as shown in a negative exit from 720, the process may return an access error for the request, as shown in 730.

As shown in 740, upon successful verification of the access requirement, the process may then perform the requested access. In the case of a read access, this may include returning the retrieved data record to the requestor, in some embodiments. In the case of a delete operation, this may include deleting the stored data record.

Figure 8:
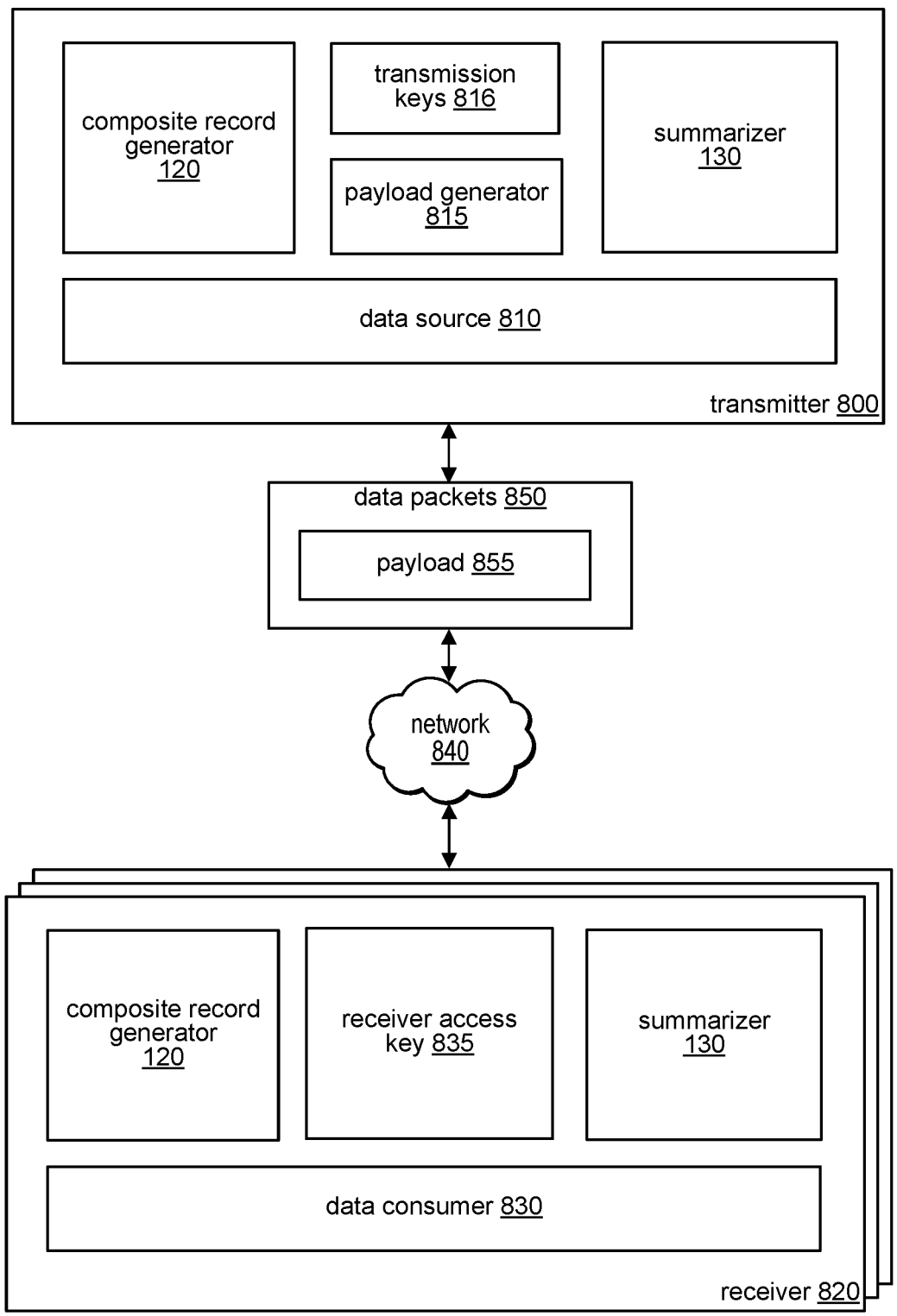
FIG. 8 illustrates a data transmission implementing metadata checking with zero overhead, according to some embodiments.

FIG. 8 illustrates a data transmission implementing metadata checking with zero overhead, according to some embodiments. A transmitter 800 may transmit data packets 850 to one or more receivers 820 over a network 840 using metadata checking with zero overhead, in various embodiments. The network 840 may use any number of networking protocols and data packet transmission may be implemented between the transmitter 800 and various receives 820 using point to point transmission, multi-point transmission such as using a multicast protocol, or broadcast transmission using a broadcast protocol. Furthermore, multiple transmission techniques may be employed simultaneously, in some embodiments. The transmitter 800 and receivers 820 may, in some embodiments, be implemented using systems such as described below in FIG. 11 and the transmitter 800 may be implemented as one or more network-based services, as discussed in further detail below in FIG. 10, in various embodiments.

Data packets 850 may include payloads 855 that are formatted by a payload generator 815 of the transmitter 800, where the payload generator 815 performs functions similar to the storage record generator 120 of FIG. 1 and described in further detail in FIG. 4. The payload generator 815 may use one of multiple transmission keys 816 to format payloads 855. To transmit a data packet 950 from a data source 810, the transmitter 900 may generate a composite data record, such as described in FIGS. 3A and 3B above, using the composite record generator 120. The data store may then generate a composite summary for the composite data record using the summarizer 130. Then, the data store 100 may generate a payload, such as shown below in FIG. 4, using the payload generator 815 and transmit the data packet over the network 940 to one or more receivers 820.

A receiver 830 may then receive the transmitted data packet, construct a composite data record, such as described in FIGS. 3A and 3B above, using the composite record generator 120 using the payload 855 and a receiver access key 835, then verify the composite record using a summarizer 130, such as by using the verify process as shown in FIG. 5. Should the verify succeed, the payload may then be forwarded to a data consumer 830 for processing.

In some embodiments, multicast or broadcast techniques may be used to transmit individual data packets 850 to multiple receivers 820 simultaneously. As such, receiver access keys 835 for multiple receivers may use the same key value. In some embodiments, different key values may be stored and a composite record format and summarizer function may be used that supports multiple access keys, such as discussed in FIG. 3A. In some embodiments, multiple access keys may be supported at each of the receivers 820 where a verifying of any of the known access keys may allow the same, or different, data consumers 830 to receive data payloads. It should be understood that these are merely examples of receiver access keys, composite records formats and summarizer functions employable for data transmission implementing metadata checking with zero overhead and that these examples are not intended to be limiting.

Figure 9:
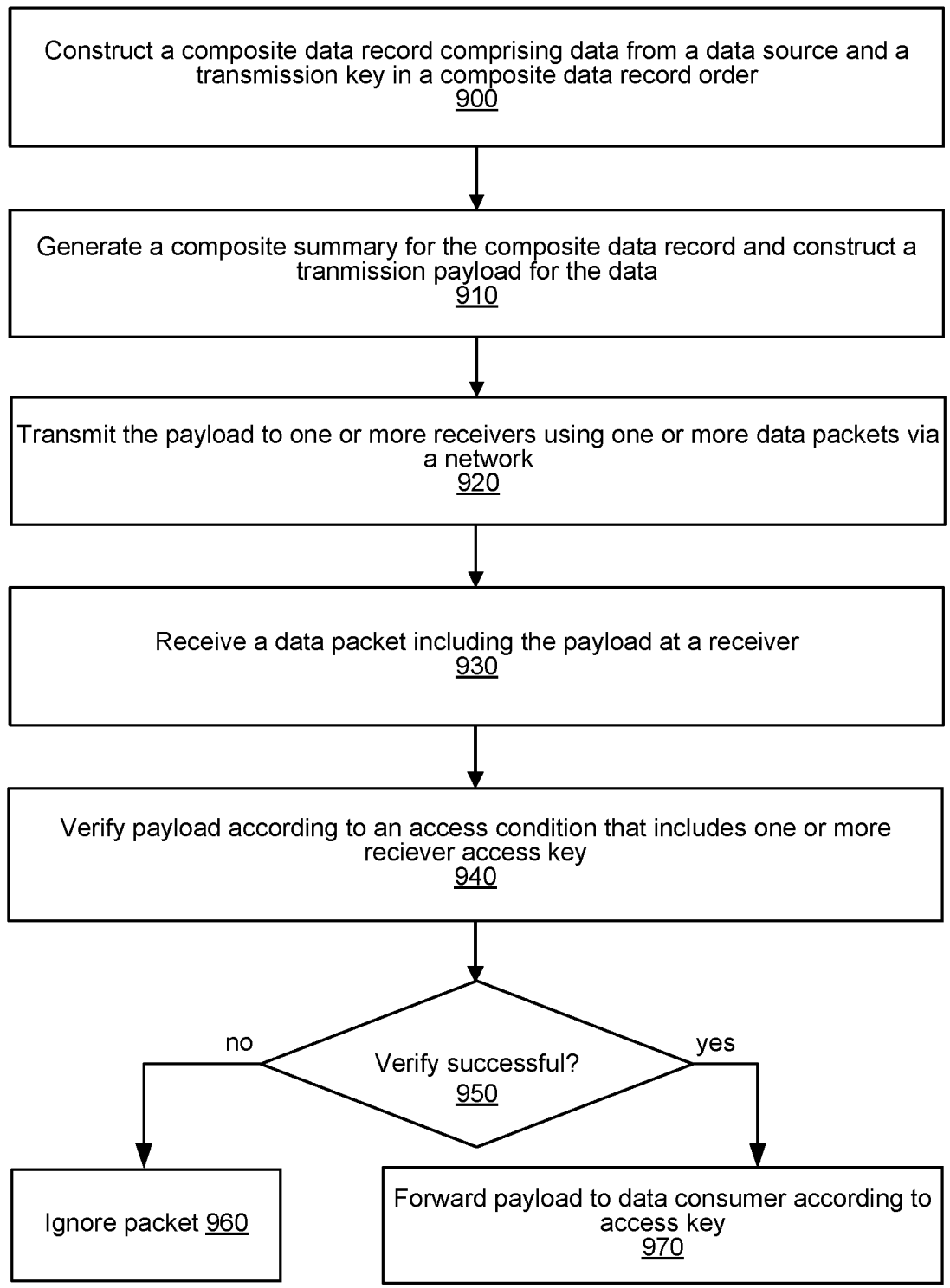
FIG. 9 illustrates a flowchart describing data transmission using metadata checking with zero overhead, according to some embodiments.

FIG. 9 illustrates a flowchart describing data transmission using metadata checking with zero overhead, according to some embodiments. The process begins at 900 where a composite data record may be constructed that includes a transmission key, such as a transmission key 816 of FIG. 8, selected for the targeted receivers and data from a data source, such as the data source 810 of FIG. 8, in a particular composite format, as discussed above in FIGS. 3A and 3B. This composite format will then be used in verification of data payloads by receivers of the transmitted data, in various embodiments.

Then, as shown in 910, a composite summary may be generated, such as by a summarizer 130 as shown in FIG. 8, for the composite data record. This composite summary may then be used to construct a payload, such as the payload 855 of FIG. 8, that includes the data and the composite summary but excludes the transmission key such that the transmission key is not transmitted over the network as part of the payload. Then, as shown in 920, the payload, including the data and composite summary, may be transmitted to one or more receivers, using one or more data packets, via a network.

A receiver, such as one of the receivers 830 as shown in FIG. 8, may then receive the transmitted data packet, in some embodiments, as shown in 930. As shown in 940, the process may then verify access for the payload using the verification process as shown in FIG. 5 and one or more receiver access keys, such as the receiver access keys 835 of FIG. 8. If the verification is successful, as shown in a positive exit from 950, the process may advance to step 970. If the verification is not successful, as shown in a negative exit from 950, the process may ignore the received data packet, as shown in 960.

As shown in 970, upon successful verification of the access requirement, the process may then forward the verified payload to a data consumer, such as the data consumer 830 of FIG. 8. In some embodiments, data consumer(s) may be selected according to the particular access key(s) which result in successful verification of the payload.

Figure 10:
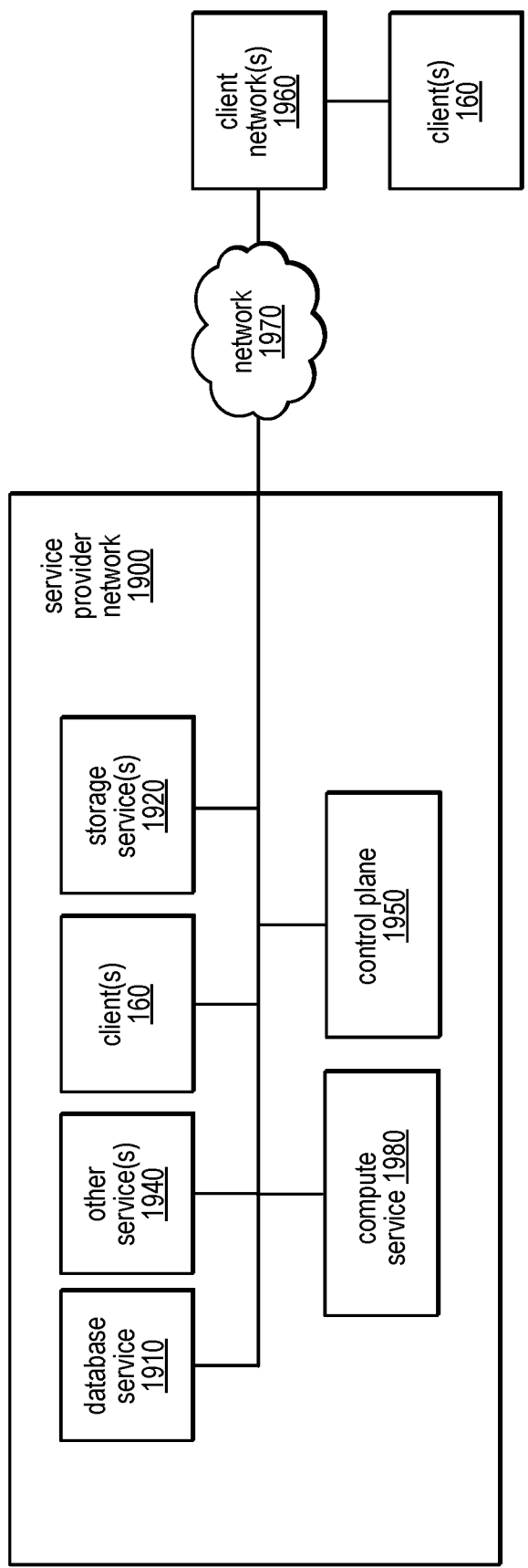
FIG. 10 illustrates an example provider network environment, according to at least some embodiments.

FIG. 10 illustrates an example provider network environment, according to at least some embodiments. Service provider network 1900 is illustrated as providing numerous other services 1940, such as, but not limited to, a database service 1910 (providing relational, non-relational database services, or both), storage service(s) 1920 (e.g., data store, key-value store, short-term, long-term, or the like, etc.), compute service 1980 (e.g., providing virtual computing capabilities) and other services 1940 as well as and clients 160. Clients 160 are illustrated as both external (communicably coupled via client networks 1960 and intermediate network 1970 (e.g., the Internet or similar) to the service provider network) and internal to the service provider network. In some embodiments, one of the services of the service provider network may be a client of another one of the services.

Service provider network 1900 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the service provider network 1900 via a publicly accessible network (e.g., the Internet, a cellular communication network). Regions are connected to a global network which includes private networking infrastructure (e.g., fiber connections controlled by the cloud provider) connecting each region to at least one other region. The service provider network 1900 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the service provider network 1900 to provide low-latency resource access to customers on a global scale with a high degree of fault tolerance and stability.

The traffic and operations of the cloud provider network may broadly be subdivided into two categories in various embodiments: control plane operations carried over a logical control plane 1950 and data plane operations carried over a logical data plane. While the data plane represents the movement of user data through the distributed computing system, the control plane 1950 represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, service provider network 1900 may include the hardware (e.g., modems, routers, switches, load balancers, proxy servers, etc.) and software (e.g., protocol stacks, accounting software, firewall/security software, etc.) necessary to establish a networking links between different components of service provider network 1900, such as computation and storage hosts, control plane components as well as external networks, such as network (e.g., the Internet). In some embodiments, service provider network 1900 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 160 may be attached to the overlay network so that when a client provides an IP address that they want to send packets to, the IP address is run in virtual space by communicating with a mapping service that knows where the IP overlay addresses are.

Figure 11:
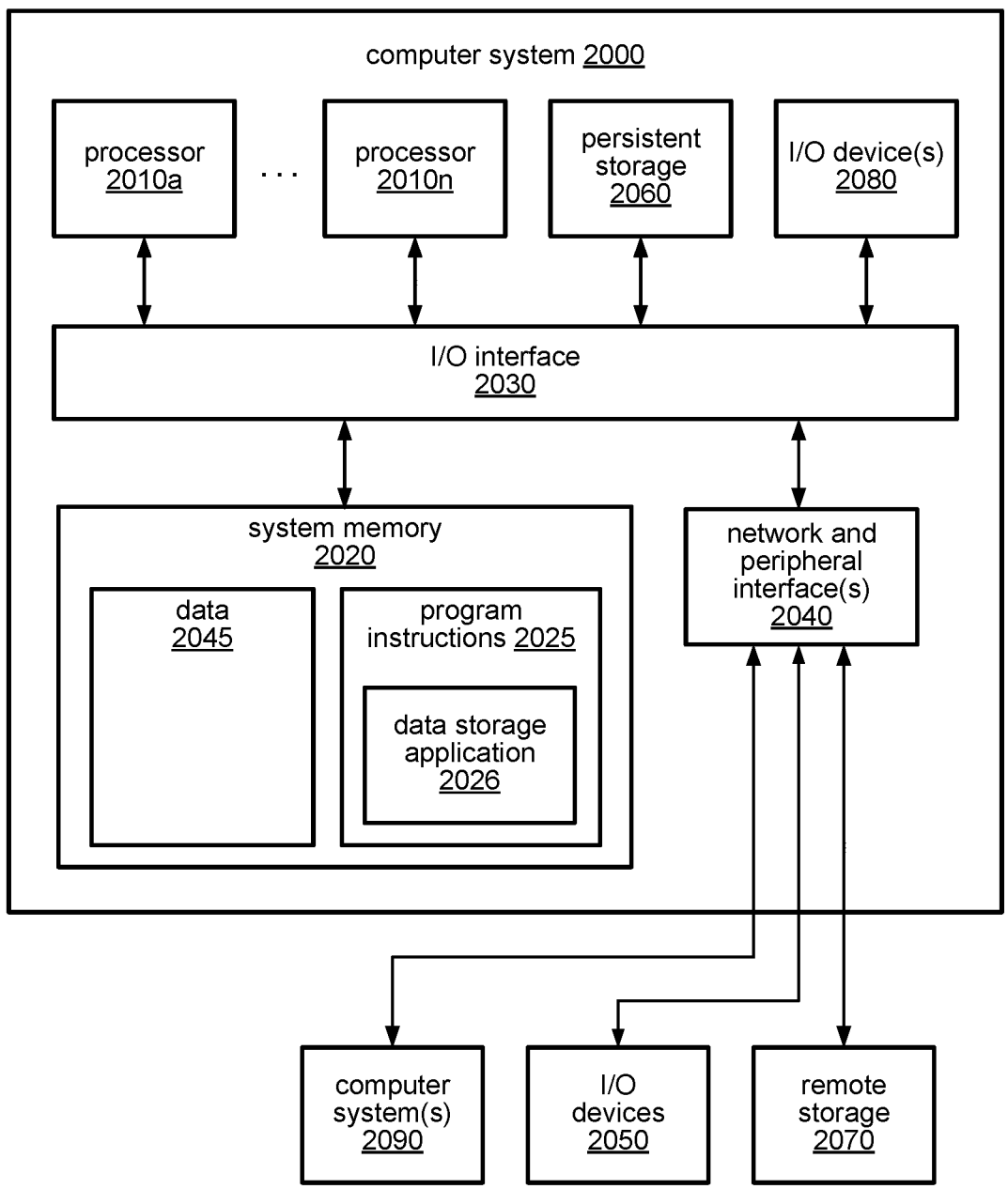
FIG. 11 is a block diagram illustrating an example computing device that may be used in at least some embodiments.

Any of various computer systems may be configured to implement processes associated with a technique for multi-region, multi-primary data store replication as discussed with regard to the various figures above. FIG. 11 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 11 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 may further include network and peripheral interface(s) 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 may further include network and peripheral interface(s) 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for a data storage application as indicated at 2026, for the downloadable software or provider network are shown stored within system memory 2020 as program instructions 2025. In some embodiments, system memory 2020 may include data 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network and peripheral interface(s) 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of a data store as described herein may be executed on one or more computer systems, which may interact with various other devices. FIG. 11 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors;
a storage device; and
a memory storing program instructions that, when executed on the one or more processors, implement a data store configured to:
  receive a request to store a data record for subsequent accesses, wherein the subsequent accesses are protected by an access condition comprising metadata provided in the request;
  store the data record responsive to receiving the request, wherein to store the data record the data store is configured to:
    generate a composite data record comprising the data record and one or more copies of the metadata in a composite format;
    determine an error detection code for the composite data record; and
    store the data record and the error detection code on the storage device, wherein the metadata is not stored on the storage device; and
  receive, subsequent to the storing, an access request to access the data record, the request comprising access metadata, and responsive to receiving the access request:
    retrieve the data record and the error detection code from the storage device;
    generate a new composite data record comprising at least the data record and one or more copies of the access metadata in the composite format;
    determine a new error detection code for the new composite data record;
    return the data record responsive to determining that the new error detection code indicates that the access metadata meets the access condition; and
    return an access error responsive to determining that the new error detection code indicates that the access metadata does not meet the access condition.

2. The system of claim 1, wherein to meet the access condition, the access metadata must match the metadata provided in the request to store the data record.

3. The system of claim 1, wherein determining that the new error detection code indicates that the access metadata meets the access condition comprises determining that the new error detection code matches the error detection code.

4. The system of claim 1, wherein the data store is a multi-tenant data store of service provider network, and wherein the access condition protects individual data records for respective tenants of the multi-tenant data store.

5. A method, comprising:
performing, by a data store comprising at least one processor, a memory and a storage device:
  receiving a request to store a data record for subsequent accesses, wherein the subsequent accesses are protected by an access condition comprising a key provided in the request;
  storing the data record responsive to receiving the request, comprising:
    generating a composite data record comprising the data record and one or more copies of the key in a composite format;

determining a summary for the composite data record; and storing the data record and the summary on the storage device, wherein the key is not stored on the storage device.

6. The method of claim 5, further comprising performing by the data store:

receiving, subsequent to the storing, an access request to access the data record, the request comprising an access key, and responsive to receiving the access request:

retrieving the data record and the summary from the storage device;

generating a new composite data record comprising at least the data record and one or more copies of the access key in the composite format;

determining a new summary for the new composite data record;

returning the data record responsive to determining that the new summary indicates that the access key meets the access condition; and returning an access error responsive to determining that the new summary indicates that the access key does not meet the access condition.

7. The method of claim 6, wherein the access key is one of a plurality of access keys that meet the access condition.

8. The method of claim 6, wherein to meet the access condition, the access key must match the key provided in the request to store the data record.

9. The method of claim 6, wherein determining that the new summary indicates that the access key meets the access condition comprises determining that the new summary matches the summary.

10. The method of claim 6, wherein the new composite data record further comprises the summary, and wherein determining that the new summary indicates that the access key meets the access condition comprises determining that the new summary matches a reserved value.

11. The method of claim 5, wherein the summary is a cyclic redundancy check code.

12. The method of claim 5, wherein the data store is a multi-tenant data store of a service provider network, and wherein the access condition protects individual data records for respective tenants of the multi-tenant data store.

13. One or more non-transitory computer-accessible storage media storing program instructions that when executed on or across one or more computing devices cause the one or more computing devices to implement a database to perform:

receiving a request to store a data record for subsequent accesses, wherein the subsequent accesses are protected by an access condition comprising a security key provided in the request;

storing the data record responsive to receiving the request, comprising:

generating a composite data record comprising the data record and one or more copies of the security key in a composite format;

determining a digest for the composite data record; and storing the data record and the digest on one or more storage devices, wherein the security key is not stored on the one or more storage devices.

14. The one or more non-transitory computer-accessible storage media of claim 13, the database further implemented to perform:

receiving, subsequent to the storing, an access request to access the data record, the request comprising an access security key, and responsive to receiving the access request:

retrieving the data record and the digest from the one or more storage devices;

generating a new composite data record comprising at least the data record and one or more copies of the access security key in the composite format;

determining a new digest for the new composite data record;

returning the data record responsive to determining that the new digest indicates that the access security key meets the access condition; and returning an access error responsive to determining that the new digest indicates that the access security key does not meet the access condition.

15. The one or more non-transitory computer-accessible storage media of claim 14, wherein the access security key is one of a plurality of access security keys that meet the access condition.

16. The one or more non-transitory computer-accessible storage media of claim 14, wherein to meet the access condition, the access security key must match the security key provided in the request to store the data record.

17. The one or more non-transitory computer-accessible storage media of claim 14, wherein determining that the new digest indicates that the access security key meets the access condition comprises determining that the new digest matches the digest.

18. The one or more non-transitory computer-accessible storage media of claim 14, wherein the new composite data record further comprises the digest, and wherein determining that the new digest indicates that the access security key meets the access condition comprises determining that the new digest matches a reserved value.

19. The one or more non-transitory computer-accessible storage media of claim 13, wherein the digest is a cryptographic hash.

20. The one or more non-transitory computer-accessible storage media of claim 13, wherein the database is a multi-tenant database of service provider network, and wherein the access condition protects individual data records for respective tenants of the multi-tenant database.

* * * * *